(12) United States Patent
Naik et al.

(10) Patent No.: US 11,055,870 B2
(45) Date of Patent: Jul. 6, 2021

(54) VEHICLE AUXILIARY CAMERA (71) Applicant: Toyota Motor Engineering & Manufacturing North America, Inc., Plano, TX (US)

(72) Inventors: Umesh P. Naik, Ann Arbor, MI (US); Coh L. Yoshizaki, Wixom, MI (US); Akio Kimura, Novi, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/521,169

(22) Filed: Jul. 24, 2019

(65) Prior Publication Data
US 2021/0027482 A1 Jan. 28, 2021

(51) Int. Cl.
*B60R 11/04* (2006.01)
*G06T 7/70* (2017.01)

(52) U.S. Cl.
CPC ................ *G06T 7/70* (2017.01); *B60R 11/04* (2013.01); *B60R 2300/10* (2013.01); *G06T 2207/30252* (2013.01)

(58) Field of Classification Search
CPC ........................................................ G06T 7/70
See application file for complete search history.

(56) References Cited

U.S. PATENT DOCUMENTS

| | | | |
|---|---|---|---|
| 6,593,960 B1* | 7/2003 | Sugimoto | B60R 11/04 348/142 |
| 7,224,396 B2* | 5/2007 | Oochi | G02B 7/32 348/345 |
| 7,561,966 B2 | 7/2009 | Nakamura et al. | |
| 8,246,001 B2* | 8/2012 | Huang | F16M 13/005 248/688 |
| 8,294,563 B2* | 10/2012 | Shimoda | B60R 1/00 340/459 |
| 8,339,253 B2 | 12/2012 | Chundrlik, Jr. et al. | |
| 9,352,692 B2* | 5/2016 | Uken | B60R 16/0207 |
| 9,361,687 B2 | 6/2016 | Shimoda et al. | |

(Continued)

OTHER PUBLICATIONS

Golson, "This connected car lets owners pay for parking, gas, and coffee—and take selfies," published on the Verge (https://www.theverge.com/2016/7/11/12149650/alibaba-saic-rx5-suv-yunos-smart-car-connected) (Jul. 11, 2016).

*Primary Examiner* — Irfan Habib
(74) *Attorney, Agent, or Firm* — Christopher G. Darrow; Darrow Mustafa PC (57) ABSTRACT

In one embodiment, an auxiliary camera unit for a vehicle includes an image capture device, a mounting mechanism for attaching the auxiliary camera unit to the vehicle, and a communication device to wirelessly transmit data to the vehicle and receive data from the vehicle. The auxiliary camera unit further includes one or more processors and a memory communicably coupled to the one or more processors and storing: a control module including instructions that when executed by the one or more processors cause the one or more processors to set one or more operational settings for the image capture device based on a position of the auxiliary camera unit relative to the vehicle and cause the communication device to transmit a video feed from the image capture device to the vehicle according to the one or more operational settings.

20 Claims, 6 Drawing Sheets

(56) References Cited

U.S. PATENT DOCUMENTS

| | | | |
|---|---|---|---|
| 9,858,669 B2 | 1/2018 | Aughey | |
| 10,150,505 B2* | 12/2018 | Herzog | G06K 9/00791 |
| 10,812,712 B2* | 10/2020 | Prabhakar | H04N 5/23245 |
| 10,913,401 B2* | 2/2021 | Bingle | H04N 5/374 |
| 2006/0171704 A1* | 8/2006 | Bingle | B60R 1/04 |
| | | | 396/419 |
| 2010/0049405 A1* | 2/2010 | Li | G08G 1/168 |
| | | | 701/45 |
| 2010/0106344 A1* | 4/2010 | Edwards | G05D 1/027 |
| | | | 701/2 |
| 2011/0267466 A1* | 11/2011 | Brester | B60R 11/04 |
| | | | 348/148 |
| 2017/0083771 A1* | 3/2017 | Clark | G06K 9/209 |
| 2017/0217372 A1* | 8/2017 | Lu | H04N 5/23293 |
| 2017/0313248 A1* | 11/2017 | Kothari | G06F 3/0416 |
| 2018/0189532 A1 | 7/2018 | Bataller et al. | |
| 2018/0272944 A1* | 9/2018 | Goncalves | H04N 5/247 |
| 2019/0031146 A1* | 1/2019 | Etonye | B60R 25/01 |

* cited by examiner

| Profile Name | Pos. ID | Zoom | Aperture | Color Sat. | Brightness | Infrared | Trigger Source | Trigger | Target | Stop |
|---|---|---|---|---|---|---|---|---|---|---|
| Rear | 2 | 2x | f.8 | 0 | 10 | N | Transmission | S.->Reverse | Rear Mir. Scr. | S.<-Reverse |
| Right-side | 3 | 1x | f.8 | 0 | 10 | N | Steering | Right Turn Signal | Dash. Screen | RT Sig. End |
| Cargo | 4 | 3x | f.4 | 0 | 30 | N | Dash. Monitor | Display Mode Sel. | Second Screen | Display Mode Sel. |
| Custom-Trailer | 5 | 1x | f5.6 | 10 | 40 | Y | Dash. Monitor | Display Mode Sel. | Second Screen | Display Mode Sel. |

VEHICLE AUXILIARY CAMERA

TECHNICAL FIELD

The subject matter described herein relates, generally, to an auxiliary camera for a vehicle, and more particularly, to an auxiliary camera having features for automatically interfacing with a vehicle.

BACKGROUND

Many vehicles include cameras to assist drivers in various driving maneuvers, such as lane change cameras and rear-view parking cameras. Such cameras are typically dedicated to a specific function and show a single, specific view. However, a driver may occasionally have a need for a view or a function that is not adequately addressed by the existing cameras installed in fixed positions on the vehicle. There is currently no easy way for a driver to resolve this problem.

SUMMARY

The disclosed apparatuses, methods and systems relate to an auxiliary camera unit that can wirelessly and automatically interface with a vehicle to quickly aid the driver without requiring extensive integration efforts by the driver.

In one embodiment, the disclosed auxiliary camera unit includes an image capture device, a mounting mechanism for attaching the auxiliary camera unit to the vehicle, and a communication device to wirelessly transmit data to the vehicle and receive data from the vehicle. The disclosed auxiliary camera unit further includes one or more processors and a memory communicably coupled to the one or more processors and storing a control module including instructions that when executed by the one or more processors cause the one or more processors to set one or more operational settings for the image capture device based on a position of the auxiliary camera unit relative to the vehicle and cause the communication device to transmit a video feed from the image capture device to the vehicle according to the one or more operational settings.

In another embodiment, a method of operating an auxiliary camera unit for a vehicle includes capturing an image using an image capture device, determining a position of the auxiliary camera unit based at least in part on the captured image, determining a profile for the image capture device based at least in part on the position, and setting one or more operational settings for the image capture device according to the profile.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with an auxiliary camera for a vehicle are disclosed. As mentioned previously, a vehicle may include fixed cameras that serve designated functions, such as a side camera to assist in lane changes, a rear camera to assist in reverse parking, etc. Nevertheless, not all vehicles are equipped with such cameras, or some vehicles may only include a camera in one position while leaving other positions uncovered. In addition, situations may arise in which a driver needs to be able to monitor an unconventional view from within the vehicle while driving.

Therefore, a movable, auxiliary camera unit is disclosed herein that provides drivers with the ability to monitor any of various views according to where the driver places the camera as needs arise. The disclosed auxiliary camera unit can seamlessly integrate with the vehicle electronic control units (ECU's) to provide different functions depending upon which region of the vehicle the camera is positioned within. For example, in one embodiment when the auxiliary camera unit is attached to a right side of the vehicle in a region near the side view mirror, oriented toward the rear of the vehicle, the camera unit can automatically detect its position and correspondingly function as a lane-change assist camera with appropriate activation and deactivation timing. In some implementations, the disclosed auxiliary camera unit can be used in autonomous vehicles, for example, to show passengers a desired custom view, as will be discussed further below. Furthermore, the versatility of the disclosed auxiliary camera unit can allow it to be switched between multiple types of uses and for multiple vehicles.

The disclosed auxiliary camera unit can include multiple, preset profiles that correspond with designated regions on the vehicle. The preset profiles define the camera settings and operational logic that the auxiliary camera unit executes in the corresponding position. For example, continuing the lane-assist implementation, in one embodiment a left-side profile can include logic to communicate with a vehicle ECU, receive an activation signal when the driver activates the left turn signal, activate the camera in a wide-angle operational setting, and automatically transmit a video feed to an appropriate display in the vehicle. Furthermore, the user can select an appropriate or desired profile for the auxiliary camera unit to operate under during a pairing operation or through a settings menu accessed via the computing device in communication with the auxiliary camera unit, such as a mobile phone or the vehicle user interface.

For situations that fall outside of the preset profiles the driver can create customized profiles to define operational settings that will provide the view the driver desires. The driver can further associate the customized profiles with regions on the vehicle or other custom views that are not included in the preset profiles, e.g., in a trailer to view cargo, beneath the vehicle to view terrain, or mounted on a companion vehicle traveling relatively close to the subject vehicle. These and other features of the disclosed auxiliary camera unit will be described in references to the figures.

Figure 1:
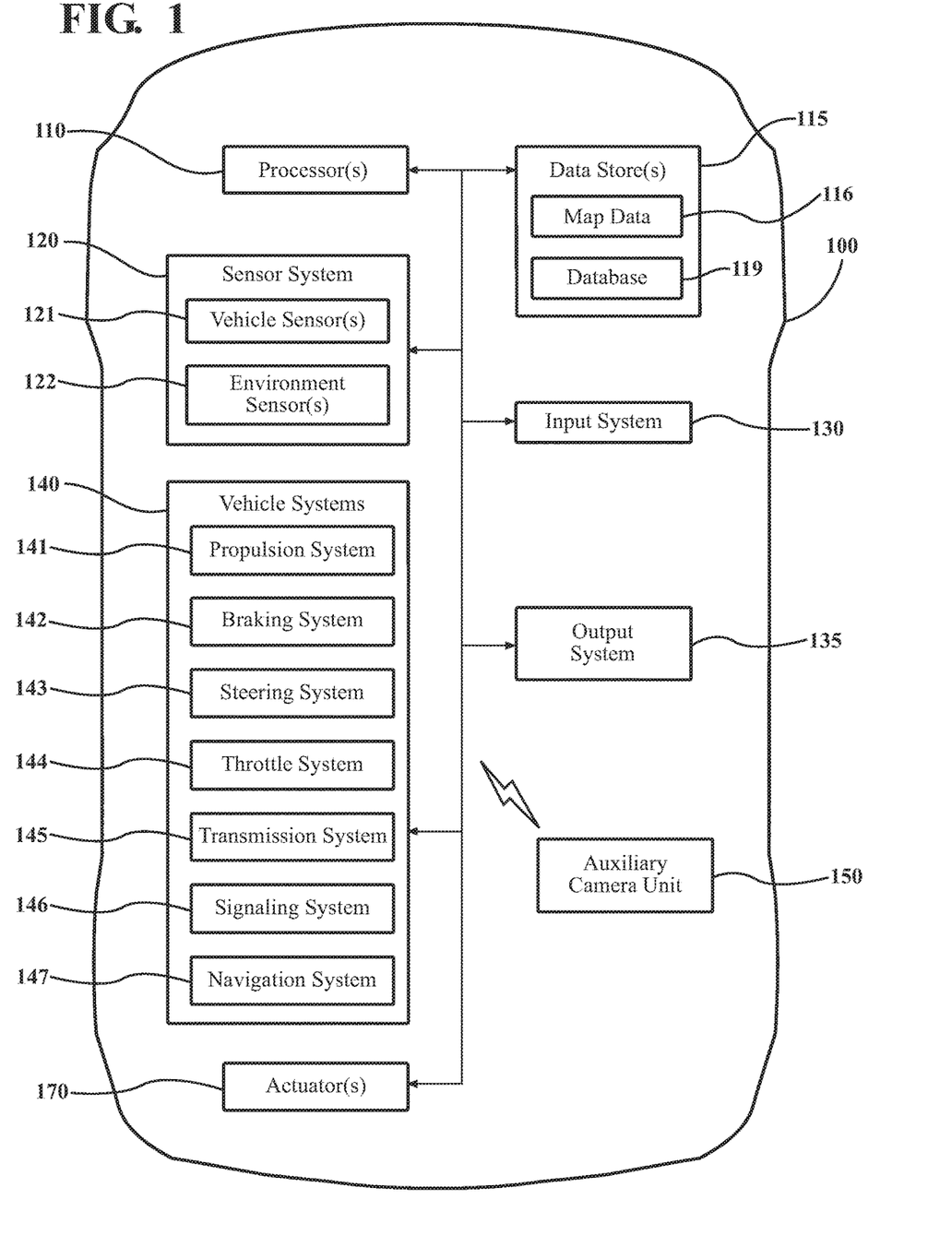
FIG. 1 illustrates one embodiment of a vehicle within which embodiments disclosed herein may be implemented.

Referring to FIG. 1, an example of a vehicle 100 that can incorporate the disclosed auxiliary camera unit is illustrated. As used herein, a "vehicle" is any form of transport that is used for moving people, animals, goods, or the like. In one or more implementations, the vehicle 100 is an automobile. While arrangements will be described herein generally with respect to automobiles, it should be understood that the scope of the disclosed subject matter is not limited to automobiles.

As shown in FIG. 1, the vehicle 100 includes multiple elements. It should be understood that in various embodiments the vehicle 100 may not necessarily include all of the elements shown in FIG. 1. The vehicle 100 can have any combination of the various elements shown in FIG. 1. Further, the vehicle 100 can have other elements in addition to those shown in FIG. 1. In some arrangements, the vehicle 100 may be implemented without one or more of the elements shown in FIG. 1. While the various elements are shown as being located within the vehicle 100 in FIG. 1, it should be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 1-5 for purposes of brevity in this description. For simplicity and clarity of illustration, where appropriate, reference numerals have been repeated among the different figures to indicate corresponding or analogous elements. In addition, while the discussion outlines numerous specific details to provide a thorough understanding of the embodiments described herein, those of ordinary skill in the art will understand that the embodiments described herein may be practiced using various combinations of these elements.

In any case, the vehicle 100 includes an auxiliary camera unit 150 that is implemented to perform methods and other functions as disclosed herein relating to providing operational features that correspond to a region of the vehicle 100 that the auxiliary camera unit 150 is mounted on, or elsewhere. The noted functions and methods will become more apparent in the following discussion of the figures.

Figure 2A:
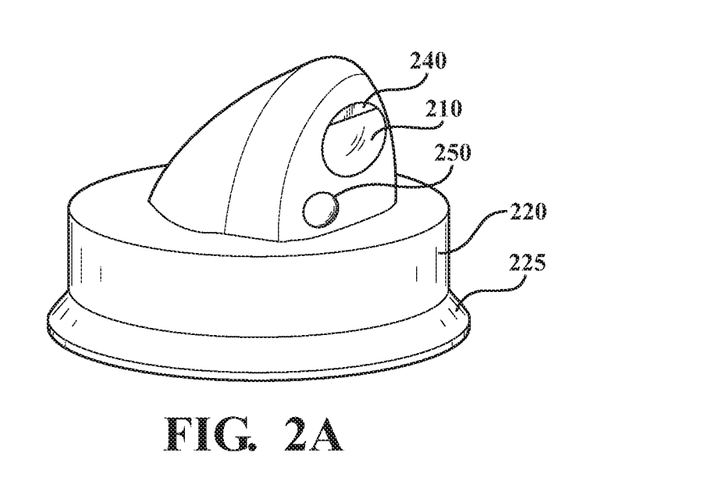
FIG. 2A illustrates one embodiment of an auxiliary camera unit according to the disclosed subject matter.

With reference to FIG. 2A, one embodiment of the auxiliary camera unit 150 of FIG. 1 is illustrated. The auxiliary camera unit 150 includes an image capture device 210, a base 220, and a mounting mechanism 225. In one or more embodiments the auxiliary camera unit 150 can optionally include an infrared (IR) light source 250 and a retractable IR filter 240. That is, in one or more embodiments the auxiliary camera unit 150 can include a mechanism to place or remove the IR filter 240 in a position between the image capture device 210 and a scene to be captured, i.e., to implement a "night-vision" mode, in accordance with operation settings.

The image capture device 210 itself can be implemented as a digital camera unit including a lens to focus incoming light onto an image sensor array, such as a complementary metal-oxide-silicon (CMOS) image array, charge coupled device (CCD) image sensor array, charge injection device (CID) image sensor array, or the like. The image capture device 210 can be configured to operate in multiple modes by adjusting various functional and optical settings, depending on the desired function of the auxiliary camera unit 150, as will be described further below.

The base 220 can include one or more rotation mechanisms (not shown) which allows the base to rotate around one or more axis, thereby changing the view and orientation of the image capture device 210 when mounted. In one or more embodiments the one or more rotation mechanisms are manually operated by a user. In one or more embodiments at least one of the one or more rotation mechanisms includes a motor and is automatically operated by the auxiliary camera unit 150.

The mounting mechanism 225 includes an attachment mechanism to attach the auxiliary camera unit 150 to the vehicle 100. For example, in one or more embodiments the attachment mechanism is implemented as a magnet, a suction cup, a hook-and-loop attachment, tab fastener, a threaded attachment, an adhesive, a snap attachment, a fastener, a slide-on rail attachment, or other type of attachment. In one or more embodiments the vehicle 100 can include multiple slots, hook-and-loop receivers, or other types of mount receivers built into the vehicle 100 at various external and internal positions at which the auxiliary camera unit 150 may be mounted. In one or more embodiments, no such receivers are built in and the auxiliary camera unit 150 is mounted using other methods, such as in the case of the magnetic or suction cup implementations.

Figure 2B:
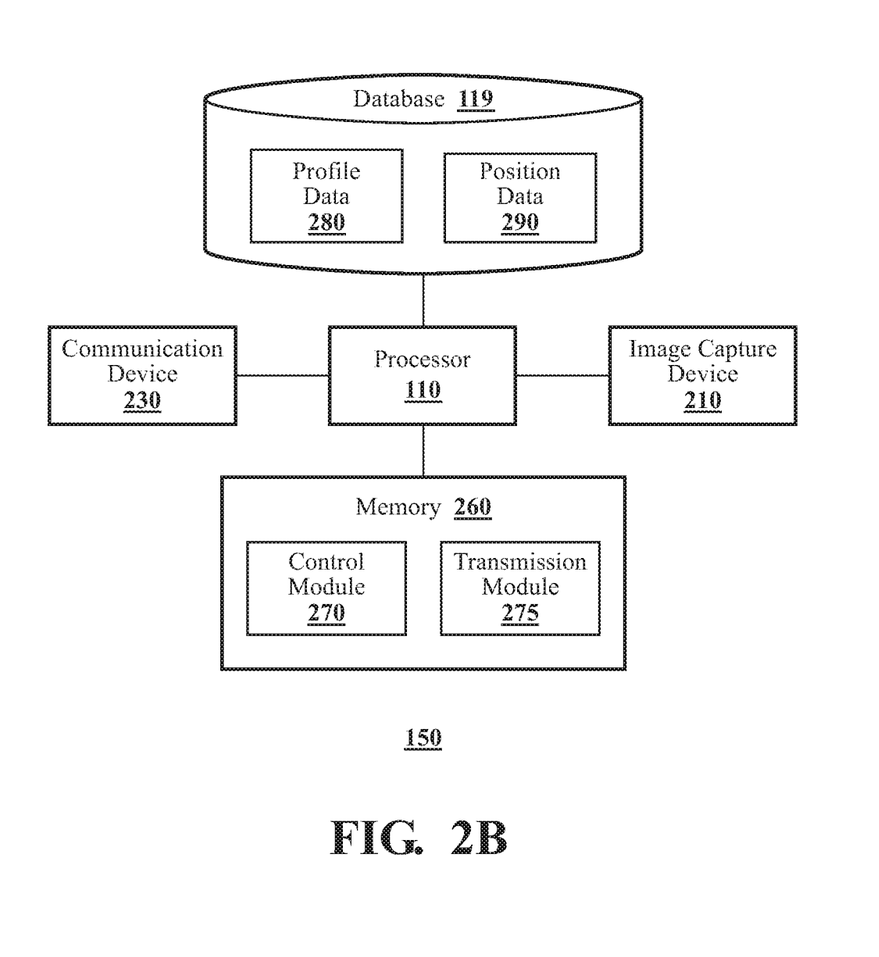
FIG. 2B illustrates a diagram of components of one embodiment of an auxiliary camera unit according to the disclosed subject matter.

FIG. 2B shows a block diagram of one embodiment of operational components of the auxiliary camera unit 150. It should be understood that the auxiliary camera unit 150 can include other components in addition to the components illustrated in FIGS. 2A and 2B. As shown in FIG. 2B, in one embodiment the auxiliary camera unit 150 includes the image capture device 210, a communication device 230, a memory 260 that stores a control module 270 and a transmission module 275, a processor 110 that executes instructions according to the modules 270, 275, and a database 119 that stores profile data 280 that defines settings for one or more operational profiles of the auxiliary camera unit 150 and position data 290 that includes images that can be used to recognize a given region.

The auxiliary camera unit 150 is shown including a processor 110 and database 119 from the vehicle 100 of FIG. 1. Accordingly, the processor 110 may be a part of the auxiliary camera unit 150, the auxiliary camera unit 150 may include a separate processor from the processor 110 of the vehicle 100 or the auxiliary camera unit 150 may access the processor 110 through wireless communication with the vehicle 100 or another communication path. For example, in one or more embodiments the auxiliary camera unit 150 can wirelessly communicate with various systems and electronic control units (ECU's) of the vehicle 100 via the communication device 230.

The communication device 230 is a wireless communication system including a radio transceiver and other components necessary to operate in accordance with one or more wireless communication standards, for example, including but not limited to IEEE 802.11 and/or Bluetooth. The communication device 230 is configured to wirelessly transmit data (e.g., video stream data, captured images, etc.) to and receive data (e.g., control signals) from one or more systems or ECU's of the vehicle 100. In one or more embodiments the communication device 230 can further be configured to periodically transmit a status signal to the vehicle 100 as part of a security measure. When the vehicle 100 does not receive the status signal, the vehicle 100 can transmit a notification to a computing device of the user.

The memory 260 is a random-access memory (RAM), read-only memory (ROM), a flash memory, or other suitable memory for storing the modules 270, 275. The modules 270, 275 can be constructed, for example, as computer-readable instructions that when executed by the processor 110 cause the processor 110 to perform the various functions disclosed herein.

The auxiliary camera unit 150 includes a database 119 which stores the profile data 280 and position data 290, each of which will be described further below. The database 119 is, in one embodiment, constructed as an electronic data structure stored in the memory 260 or another data store, such as the vehicle 100 data store 115, a cloud-based storage, a removable memory device, or another suitable location that is accessible to the modules 270, 275. The database 119 is configured with routines that can be executed by the processor 110 for analyzing stored data, providing stored data, organizing stored data, and so on. Thus, in one embodiment, the database 119 stores data described above (as well as other data) used by the modules 270, 275 in executing various functions.

The profile data 280 stores one or more profiles that define one or more settings for the auxiliary camera unit 150 according to where the auxiliary camera unit 150 is mounted. For example, a profile can correspond to a mounting location within an exterior region on the vehicle, an interior region of the vehicle 100, or on a separate vehicle that is traveling with the vehicle 100, such as a trailer, companion vehicle in a caravan, etc. The profile can define operational settings for the image capture device 210, such as focal length (zoom), aperture settings, image depth, color balance, exposure, crop, etc. The profile can also define interface settings that determine how the auxiliary camera unit 150 will interact with the vehicle human machine interface (HMI), for example, in defining which display a video feed from the auxiliary camera unit 150 will appear on and what format it will appear in. The profile can further define how various systems and ECU's of the vehicle 100 can interact with and/or request data from the auxiliary camera unit 150, for example, via trigger signals that activate the image capture device 210.

FIGS. 3A-3E show different views of an example vehicle 100 and different example implementations of mounting the disclosed auxiliary camera unit 150. The examples are provided to aid in understanding the disclosed subject matter and are not an exhaustive listing of all possible implementations of the disclosed subject matter. It should be understood that other implementations not shown here are possible and within the scope of the disclosed subject matter.

The profile data 280 can include one or more preset profiles that define commonly used functions for when the auxiliary camera unit 150 is mounted within predefined regions. The preset profiles can be constructed by the manufacturer and specifically designed per vehicle. Several example preset profiles will now be discussed. It should be understood that these profiles are merely illustrations with example settings provided to aid in understanding possible profiles. In implementation preset profiles can differ from the examples discussed below, and can be customized per vehicle.

Figure 3A:
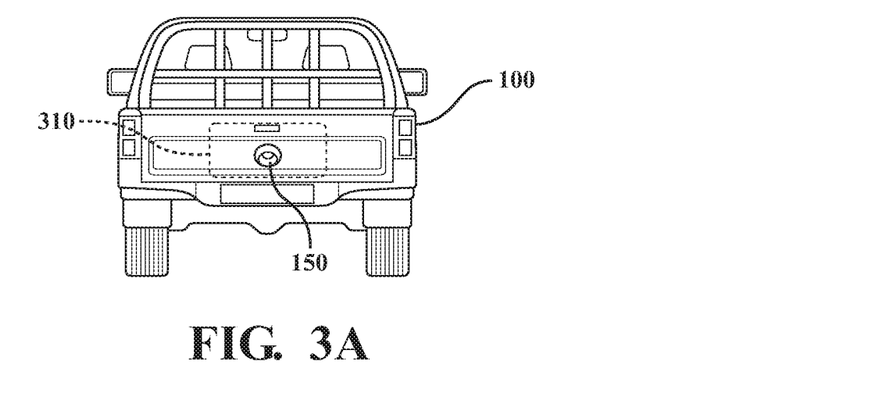
FIG. 3A illustrates an example of a rear view of a vehicle having a mounted auxiliary camera unit according to the disclosed subject matter.

Referring to FIG. 3A a preset rear-profile can define operational and interface settings that cause the auxiliary camera unit 150 to function as a rear parking-assist camera when the auxiliary camera unit 150 is mounted within a region 310 on the rear exterior of the vehicle 100. For example, as will be discussed further below, rear-profile operational settings for the image capture device 210 can include setting the focal length to a wide angle view, while the rear-profile interface settings can include defining the circumstance under which the image capture device 210 will be activated (i.e., when the vehicle 100 is in reverse) and which display the video feed from the image capture device 210 will be displayed on.

Figure 3B:
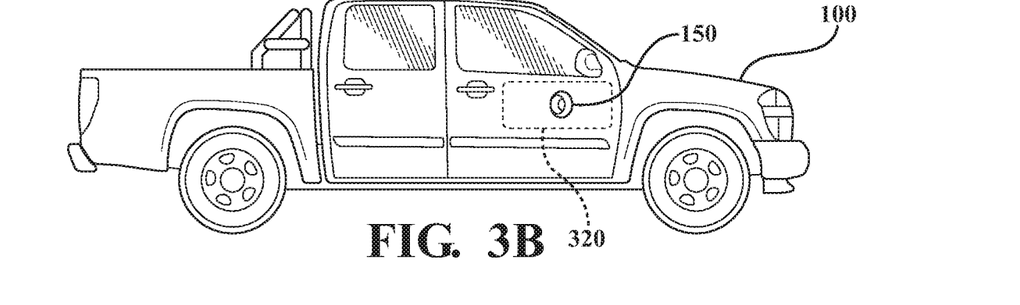
FIG. 3B illustrates an example of a side view of a vehicle having a mounted auxiliary camera unit according to the disclosed subject matter.

Referring to FIG. 3B, as another example a right-side profile can define operational and interface settings that cause the auxiliary camera unit 150 to function as a right lane-change assist camera when the auxiliary camera unit 150 is mounted within a region 320 on the right side exterior of the vehicle 100. That is, the example right-side profile can define operational settings for the image capture device 210 such as a cropped view that excludes showing the vehicle but instead shows the road, while the right-side profile interface settings can define the circumstances under which the image capture device will be activated (when the right-turn signal is on) and which display the video feed from the image capture device 210 will be displayed on.

Figure 3C:
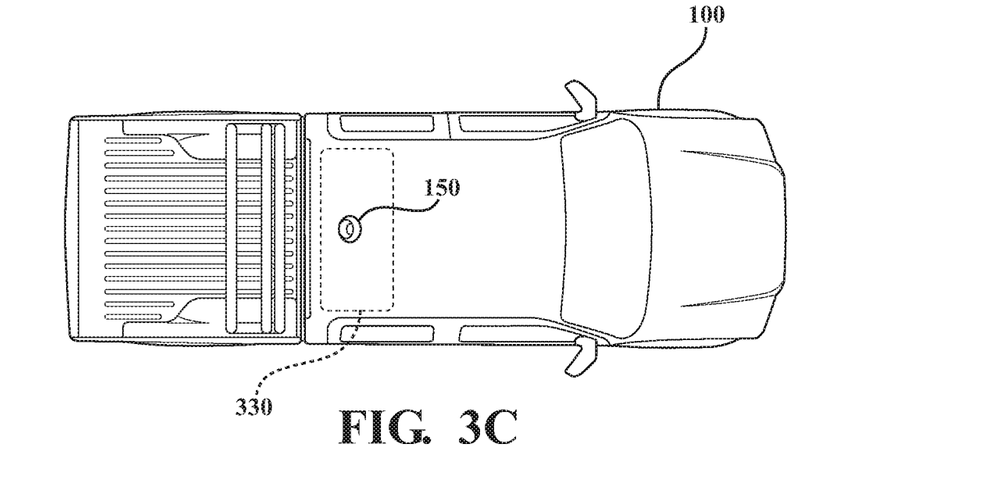
FIG. 3C illustrates an example of a top-down view of a vehicle having a mounted auxiliary camera unit according to the disclosed subject matter.

As another example, referring to FIG. 3C a roof-rear profile can define operational and interface settings that cause the auxiliary camera unit 150 to function as a cargo bed monitor when the auxiliary camera unit 150 is mounted within a region 330 on the rear of the roof of the vehicle 100. The example roof-rear profile can define operational settings for the image capture device 210 to capture a cropped, zoomed-in view of a central field of view to focus on the cargo bed while the roof-rear profile interface settings can define the circumstances under which the image capture device will be activated (when selected by a menu option in the vehicle interface) and which display the video feed from the image capture device 210 will be displayed on.

Figure 3D:
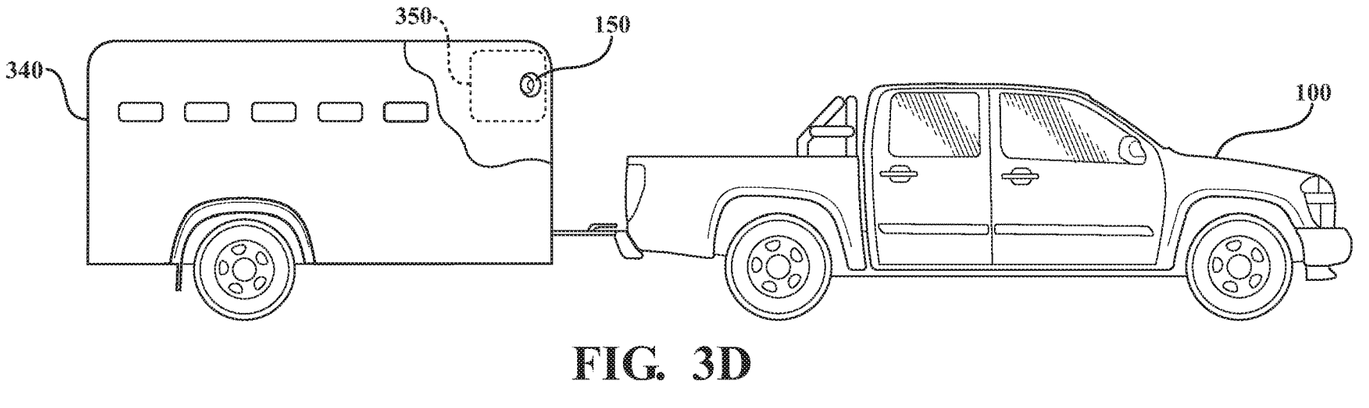
FIG. 3D illustrates an example of a side view of a vehicle pulling a trailer having a mounted auxiliary camera unit according to the disclosed subject matter.

Implementation of the mounting position of the auxiliary camera unit 150 and the corresponding profile is not limited to direct placement on the vehicle 100. FIG. 3D shows a vehicle 100 pulling a trailer 340. A cut-away view of the trailer 340 shows an auxiliary camera unit 150 mounted in a region 350 in the interior of the trailer 340, for example, to allow the driver of vehicle 100 to monitor an animal being transported in the trailer 340.

Figure 3E:
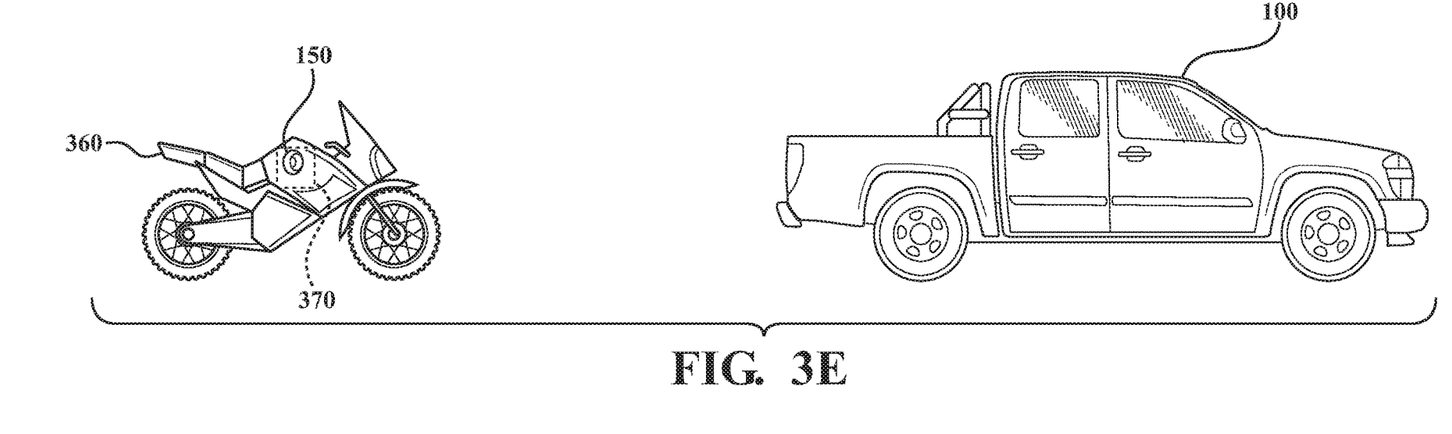
FIG. 3E illustrates an example of a side view of a vehicle preceding a companion vehicle having a mounted auxiliary camera unit according to the disclosed subject matter.

FIG. 3E shows another example implementation in which the auxiliary camera unit 150 is not mounted directly on the vehicle 100. The auxiliary camera unit 150 is mounted with a region 370 on a companion vehicle 360 (e.g., a motorcycle) that is traveling with the vehicle 100. Although the companion vehicle 360 is depicted as a motorcycle, it should be understood that the companion vehicle 360 could be any type of vehicle, for example, a bus or another automobile carrying passengers (e.g., children) who are of interest to the driver of the vehicle 100.

Figure 4:
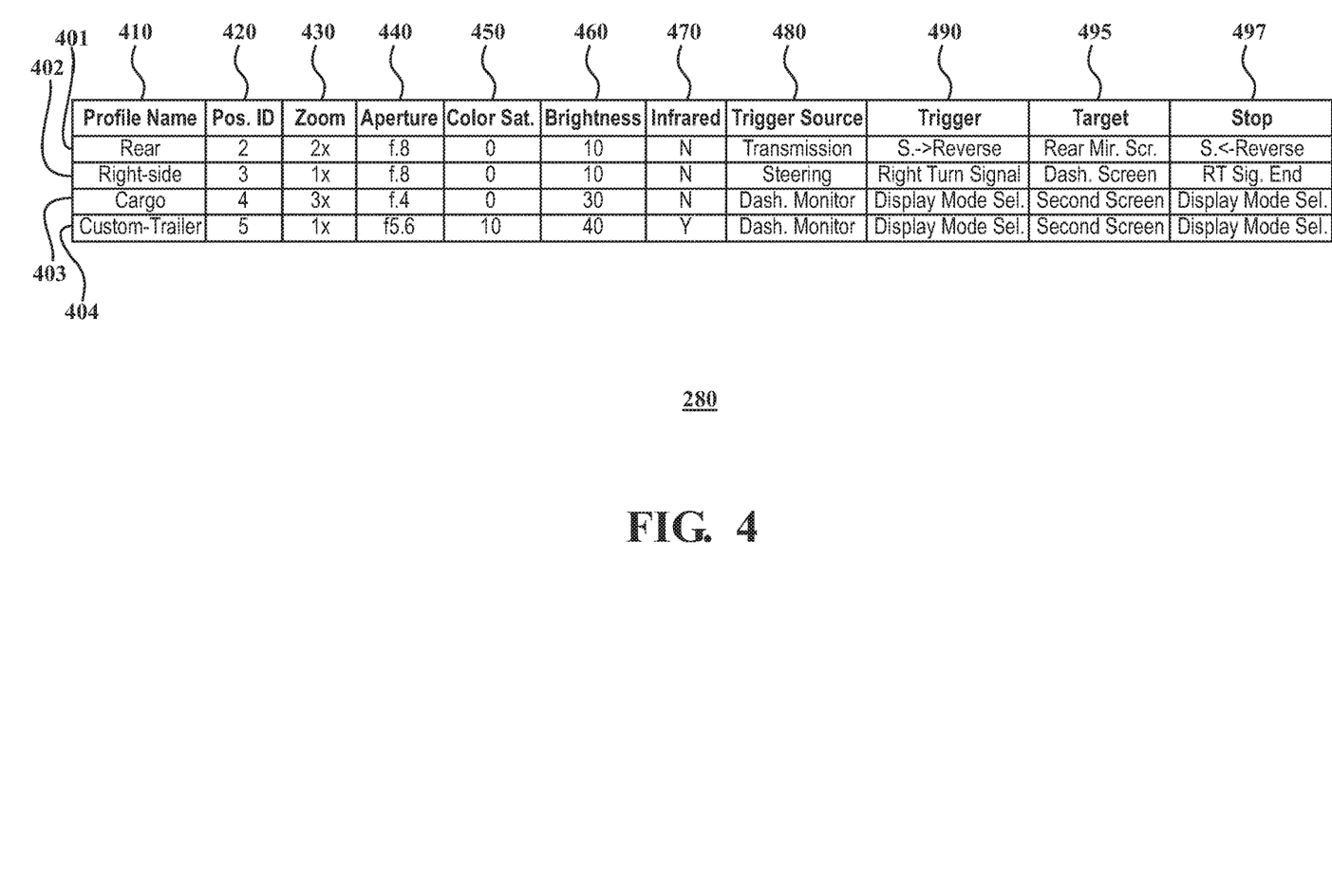
FIG. 4 illustrates an example set of profile data according to the disclosed subject matter.

FIG. 4 shows an example set of profile data 280. As previously discussed, the profile data 280 can include one or more profiles 401-404. Various parts of a profile will now be described, however, it should be understood that in implementation a profile does not necessarily need to include each described part. Furthermore, a profile can include additional parts not listed here.

In one or more embodiments, a profile, for example profile 401, can include identification components such as a profile name 410 and a position identifier (ID) 420, and operational settings components such as zoom 430, aperture 440, color saturation 450, brightness 460, and infrared 470. The settings components can differ between profiles. That is, each profile can define settings that are optimized for the particular use that the profile is designed for.

A profile can also include operational components such as parameters indicating how the auxiliary camera unit 150 is activated while operating under the profile, for example, by including a trigger source 480 and a trigger signal 490 that indicates auxiliary camera unit 150 should initiate a video feed, a target display 495 to which the video feed should be transmitted, and a stop signal 497 that indicates the auxiliary camera unit 150 should stop the video feed.

The position ID 420 indicates a region or position that the auxiliary camera unit 150 will apply the profile settings in. A position ID 420 is an identifier that is associated with a region that can be identified by one or more images in the position data 290. For example, profile 402, which is a profile associated with the right side of the vehicle 100, can have a specific position ID (3) that can be associated with or identified by one or more images captured from within a designated region on the right side of the vehicle (e.g., region 320 in FIG. 3B). The region associated with the position ID can be selected by the manufacturer for preset profiles or selected by a user for a custom profile.

While the auxiliary camera unit 150 may include multiple default profiles (401-403), the default profiles likely will not cover every possible situation that a user may envision using the auxiliary camera unit 150 for. Accordingly, a user may create custom profiles to suit additional needs that arise. For example, in one implementation where the default profiles correspond to regions located on the exterior of the vehicle 100, a user may create a custom profile 404 for mounting the auxiliary camera unit 150 in a trailer that is transporting animals (e.g., as shown in FIG. 3D). In the example profile 404, the user will be traveling at night and has elected to implement the infrared light source 250 option. The infrared filter 240 is mechanically configured to be automatically move in between or from between the image capture device 210 and a scene to be captured by the image capture device 210 in accordance with the operational settings. Therefore, for this custom profile the infrared filter 240 will automatically move into place to filter reflected infrared light generated by the infrared light source. The trigger source for the profile is the dashboard monitor, and the trigger signal is a selection signal from the display monitor switching the display mode to the auxiliary camera unit 150.

Figure 5:
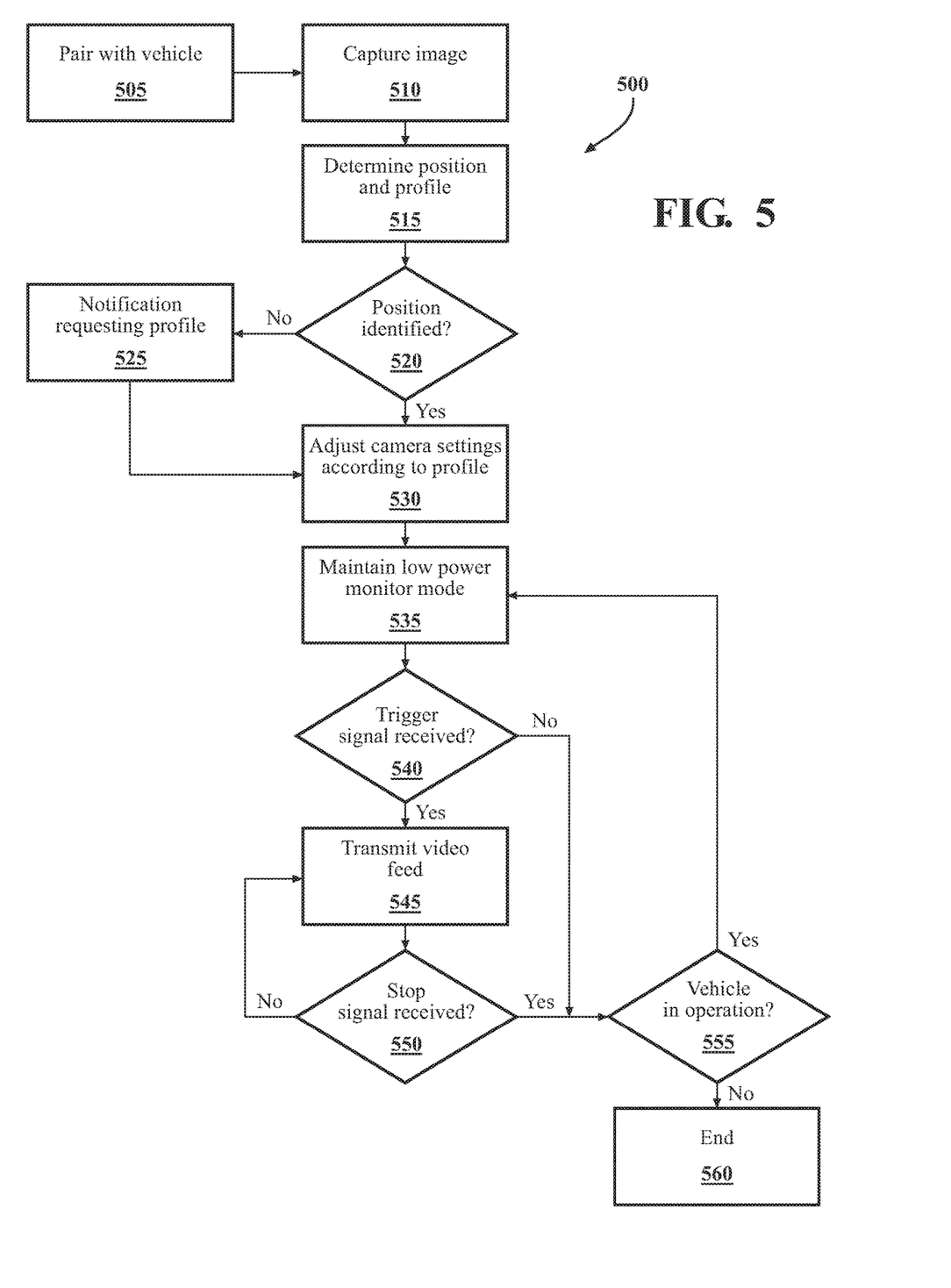
FIG. 5 illustrates a method of operating an embodiment of an auxiliary camera unit according to the disclosed subject matter.

FIG. 5 shows a method 500 of operation for an example auxiliary camera unit 150 according to the disclosed subject matter. After a user mounts the auxiliary camera unit 150 in a desired location and turns the auxiliary camera unit 150 on, at operation 505 the control module 270 attempts to pair the auxiliary camera unit 150 with the vehicle 100 to establish communication relationship between the auxiliary camera unit 150 and the vehicle 100.

At operation 510 the control module 270 controls the image capture device 210 to capture one or more images of the scene presently in view of the auxiliary camera unit 150. In one or more embodiments, the images can be taken at varying settings to capture additional data. In one or more embodiments in which the auxiliary camera unit 150 is configured to perform autonomous rotational movement, the one or more images can be taken at varying degrees of rotation.

At operation 515 an attempt is made to determine the current region or position that the auxiliary camera unit 150 is mounted in. In one or more embodiments the control module 270 can attempt to make the determination by performing image recognition on the one or more images captured during operation 510. That is, the control module 270 can attempt to recognize elements in the captured image(s) that allow the control module 270 to match the captured image(s) with known, stored images that are already associated with various profiles. If a match is found, then the control module 270 determines that the auxiliary camera unit 150 is mounted within the matching position. Based on the position ID, the control module 270 can determine the corresponding profile.

In one or more embodiments, to reduce size and power requirements of the auxiliary camera unit 150, the control module 270 can include instructions to cause the communication device 230 to transmit the images to the vehicle 100 to allow the vehicle 100 system to handle processing the image recognition analysis and make the determination. The control module 270 can then receive the position ID or the profile from the vehicle.

In some circumstances it is possible that the control module 270 or the vehicle 100 is unable to identify the position, e.g., due to poor lighting or due to the auxiliary camera unit 150 being mounted in a new region that it has not been mounted in before. Thus, at operation 520 the control module 270 determines whether the current position has been positively identified. If the position has not been identified, at operation 525, the control module 270 causes the communication device 230 to transmit a notification to the vehicle 100 for display on a user interface in the vehicle, requesting that the user select a profile that the auxiliary camera unit 150 should operate under or create a new profile for the current position.

At operation 530, after the profile has been obtained by the control module 270, the control module 270 adjusts the image capture device 210 settings in accordance with the profile. For example, for a cargo bed profile 403 (FIG. 4), the control module 270 can adjust the zoom setting of the image capture device 210 according to the profile parameters to ×3, and similarly set other settings for the image capture device 210 according to the profile parameters.

At operation 535 the control module 270 maintains the auxiliary camera unit 150 in a low power mode. In one or more embodiments the auxiliary camera unit 150 is powered by a rechargeable battery. In use, the auxiliary camera unit 150 may be attached to the exterior of the vehicle 100 for long periods of time. Therefore, maintaining a low power-use state can extend the battery life of the auxiliary camera unit 150. For example, in the low power mode the image capture device 210 can be turned off and no video feed is transmitted to preserve power.

While in the low-power mode, the control module 270 can still monitor for signals from the vehicle 100. The signals can be, for example, a trigger signal from a vehicle ECU, a signal indicating that the vehicle is shutting down, an information signal from a vehicle system, or other type of signal. For example, regarding information signals, the vehicle 100 can share information with the auxiliary camera unit 150, such as sensor data. For example, in one or more embodiments, the vehicle 100 can include an ambient light sensor and share data from the sensor with the auxiliary camera unit 150. The auxiliary camera unit 150 can take an appropriate action in response to the data received from an information signal, such as adjust a setting of the image capture device 210 based on ambient light data received from the vehicle 100. Actions taken in response to a trigger signal are discussed below.

At operation 540 the control module 270 determines whether it has received a trigger signal. If no trigger signal is received, at operation 555 the control module 270 can periodically check whether the vehicle 100 is still operating, e.g., the vehicle is on and/or being driven. While no trigger signal is detected and the vehicle 100 is still operating, the control module 270 maintains the low-power mode and continues monitoring. When the control module 270 receives a trigger signal, at operation 545 it activates the image capture device 210 and the transmission module 275 transmits the video feed to the display to the target display defined in the profile. For example, referring to the rear profile 401 (FIG. 4), when the control module 270 receives a trigger signal from the transmission control unit indicating that the vehicle 100 has been shifted into reverse, the control module 270 activates the image capture device 210 and the transmission module 275 causes the communication device 230 to transmit the video feed to the rear mirror screen.

While the communication device 230 continues to transmit the video feed, the control module 270 checks whether a stop signal has been received at operation 550. A stop signal can be a specific signal defined by the profile or a general stop signal issued by a control system of the vehicle 100. For example, in the right-side profile 402 (FIG. 4), in which the auxiliary camera unit 150 functions as a lane change assist camera, a stop signal can be defined as a signal transmitted when the right-turn signal is deactivated.

If no stop signal has been received, the communication device 230 continues to transmit the video feed. When the control module 270 detects that a stop signal has been received, it checks whether the vehicle 100 is still operating at operation 555. If the vehicle is still in operation the control module 270 returns the auxiliary camera unit 150 to a low-power mode at operation 535, thereby ending the transmission of the video feed. If the vehicle is no longer in operation the process ends at operation 560.

Thus, the disclosed auxiliary camera unit 150 can provide a wide variety of functions to aid a driver in multiple, different situations. The close integration with the vehicle 100 allows a high degree of customization as well as seamless transitions between tasks. Furthermore, various "smart" functions, e.g., related to automatic position recognition, profile determination and battery preservation, reduce the amount of effort the user needs to exert to make use of the disclosed auxiliary camera unit 150.

FIG. 1 will now be discussed in full detail as an example environment within which the system and methods disclosed herein may operate. As previously explained, the vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

As noted above, the vehicle 100 can include a sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. In one or more embodiments, data from the vehicle sensor(s) can be used as a trigger signal or a stop signal for the disclosed auxiliary camera unit 150.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). In one or more embodiments, the input system 130 can receive inputs to adjust settings for the disclosed auxiliary camera unit 150, such as to select or create a profile. The vehicle 100 can include an output system 135. An "output system" includes any device, component, or arrangement or groups thereof that enable information/data to be presented to a vehicle passenger (e.g., a person, a vehicle passenger, etc.). The output system 135 can include multiple displays, monitors, screens, etc., which may serve as a target for the video feed of the disclosed auxiliary camera unit 150.

The vehicle 100 can include one or more vehicle systems 140. The vehicle systems 140 can be controlled by various ECU's, which can interact with the disclosed auxiliary camera unit 150, for example, in any of the ways discussed above. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110 and/or the auxiliary camera unit 150 can be operatively connected to communicate with the various vehicle systems 140 and/or individual components thereof. For example, returning to FIG. 1, the processor(s) 110 and/or the auxiliary camera unit 150 can be in communication to send and/or receive information to/from the various vehicle systems 140.

The vehicle 100 can include one or more actuators 170. The actuators 170 can be any element or combination of elements operable to modify, adjust and/or alter one or more of the vehicle systems 140 or components thereof to responsive to receiving signals or other inputs from the processor(s) 110. Any suitable actuator can be used. For instance, the one or more actuators 170 can include motors, pneumatic actuators, hydraulic pistons, relays, solenoids, and/or piezoelectric actuators, just to name a few possibilities.

The vehicle 100 can include one or more modules, at least some of which are described herein. The modules can be constructed as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Various aspects of the systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements of some of the components described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An auxiliary camera unit for a vehicle and mountable on the vehicle, comprising:
   an image capture device;
   a mounting mechanism connected to the auxiliary camera unit and configured to attach the auxiliary camera unit to the vehicle;
   a communication device operable to wirelessly transmit data to the vehicle and receive data from the vehicle;
   one or more processors; and
   a non-transitory memory communicably coupled to the one or more processors and storing:
      a control module including instructions that when executed by the one or more processors cause the one or more processors to set one or more operational settings for the image capture device to a first setting based on the auxiliary camera unit being mounted at a first position relative to the vehicle and to set the one or more operational settings to a second setting different from the first setting based on the auxiliary camera unit being mounted at a second position relative to the vehicle, and
      a transmission module to transmit a video feed from the image capture device to the vehicle according to the one or more operational settings.

2. The auxiliary camera unit of claim 1, wherein the control module further includes instructions to maintain the auxiliary camera unit in a low-power state until a trigger signal is received from the vehicle, where the low-power state includes maintaining the image capture device in a powered-off mode.

3. The auxiliary camera unit of claim 1, wherein the control module further includes instructions to determine a position of the auxiliary camera unit by: 1) causing the image capture device to capture an image, and 2) determining the position based on the image.

4. The auxiliary camera unit of claim 1, wherein the control module further includes instructions to determine a position of the auxiliary camera unit by: 1) causing the image capture device to capture an image, 2) causing the communication device to transmit the image to the vehicle, and 3) receiving the position from the vehicle.

5. The auxiliary camera unit of claim 1, wherein the one or more operational settings include one or more of: a zoom setting, a focal point setting, an exposure setting, and a capture mode.

6. The auxiliary camera unit of claim 1, wherein the control module sets the one or more operational settings according to a profile that corresponds to a position of the auxiliary camera unit.

7. The auxiliary camera unit of claim 6, wherein the profile indicates which display among a plurality of displays in the vehicle the video feed is transmitted to.

8. The auxiliary camera unit of claim 1, further comprising:
an infrared light source to direct infrared light toward a scene to be captured by the image capture device; and
an infrared filter disposed between the image capture device and the scene to be captured by the image capture device, the infrared filter operable to filter reflected infrared light generated from the infrared light source,
wherein the infrared filter is mechanically configured to be automatically removed from between the image capture device and the scene to be captured in accordance with the one or more operational settings.

9. The auxiliary camera unit of claim 1, further comprising:
a base including one or more rotation mechanisms that allow the base to rotate around one or more axis, thereby changing a view of the image capture device.

10. The auxiliary camera unit of claim 1, wherein the control module further includes instructions to activate the image capture device and cause the communication device to transmit the video feed to the vehicle in response to receiving a trigger signal from the vehicle.

11. A method of operating an auxiliary camera unit for a vehicle, comprising:
attaching the auxiliary camera unit to the vehicle using a mounting mechanism connected to the auxiliary camera unit;
capturing an image using an image capture device of the auxiliary camera unit;
determining a position of the auxiliary camera unit based at least in part on the captured image;
determining a profile for the image capture device based at least in part on the position; and
setting one or more operational settings for the image capture device to a first setting according to the profile and the auxiliary camera unit being mounted to a first position relative to the vehicle, and setting one or more operational settings for the image capture device to a second setting based on the auxiliary camera unit being mounted to a second position relative to the vehicle.

12. The method of claim 11, wherein determining the position of the auxiliary camera unit comprises:
transmitting the image to a processor of the vehicle; and
receiving the position from the processor of the vehicle.

13. The method of claim 11, wherein determining the position of the auxiliary camera unit comprises:
executing an image recognition operation on the image to identify the position.

14. The method of claim 11, wherein determining the position comprises determining that the auxiliary camera unit is attached to a second vehicle separate from the vehicle.

15. The method of claim 11, further comprising:
maintaining the auxiliary camera unit in a low-power state, where the low-power state includes maintaining the image capture device in a powered-off mode;
receiving a trigger signal from a system of the vehicle; and
activating the auxiliary camera unit to transmit a video feed to a display in the vehicle in accordance with the one or more operational settings of the profile.

16. The method of claim 15, wherein the profile designates the display out of a plurality of displays available in the vehicle.

17. The method of claim 15, further comprising:
receiving a stop signal; and
returning the auxiliary camera unit to the low-power state in response to the stop signal.

18. The method of claim 11, wherein determining the profile comprises:
determining that no profile that corresponds to the position is available; and
receiving a new profile from a user to function as the profile and correspond to the position.

19. The method of claim 11, further comprising:
receiving a signal from the vehicle indicating a level of ambient light in an environment around the vehicle; and
adjusting the one or more operational settings for the image capture device based on the signal.

20. The method of claim 11, wherein the one or more operational settings include one or more of: a zoom setting, a focal point setting, an exposure setting, and a capture mode.

\* \* \* \* \*